March 6, 1956     J. E. ROSE     2,737,315
TWIN BIN HOPPER CONSTRUCTION
Filed Jan. 18, 1952     5 Sheets-Sheet 1
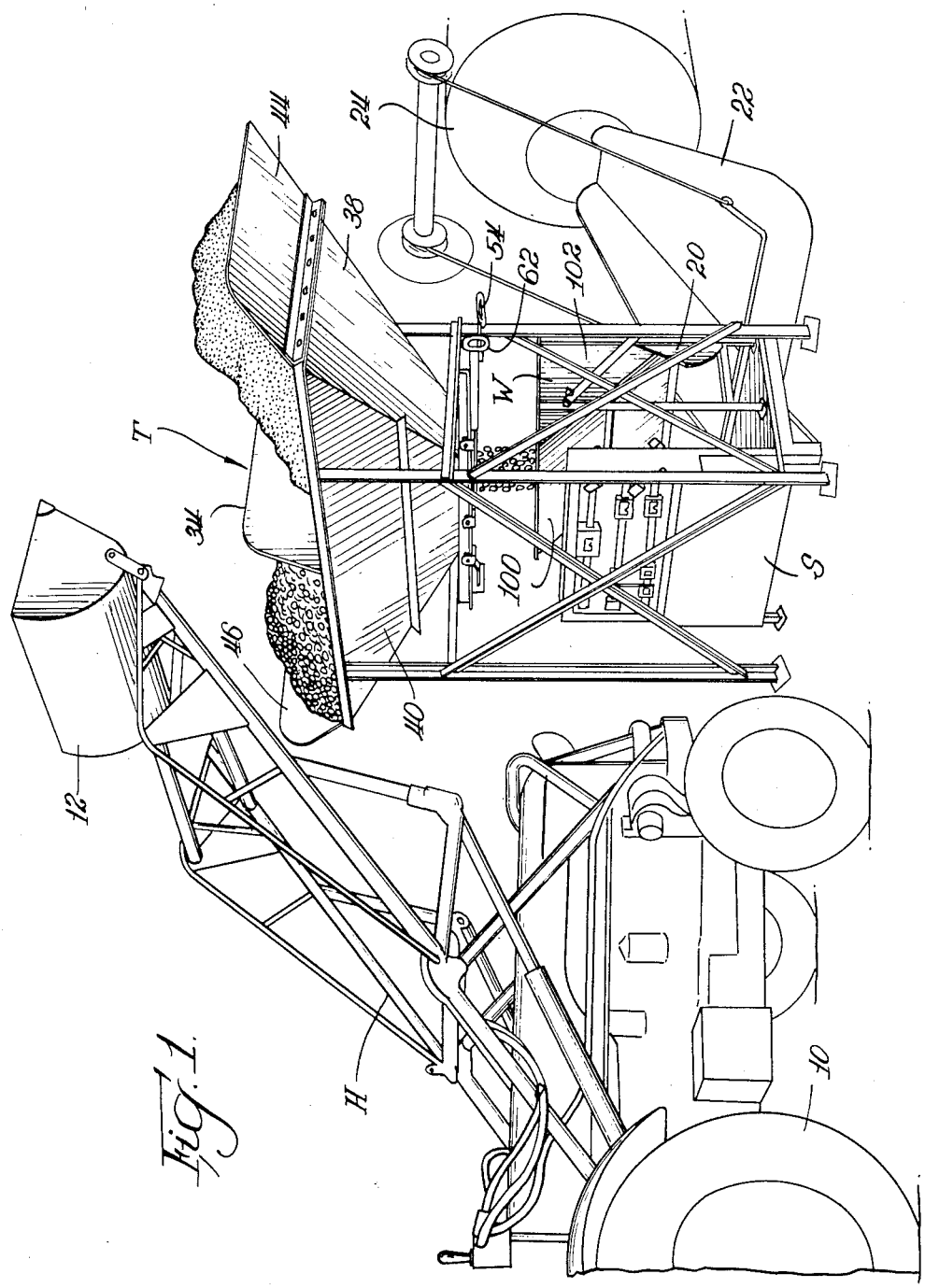
INVENTOR.
JOHN E. ROSE
BY Harry H. Hitzeman
ATTORNEY.

March 6, 1956    J. E. ROSE    2,737,315
TWIN BIN HOPPER CONSTRUCTION
Filed Jan. 18, 1952    5 Sheets-Sheet 2
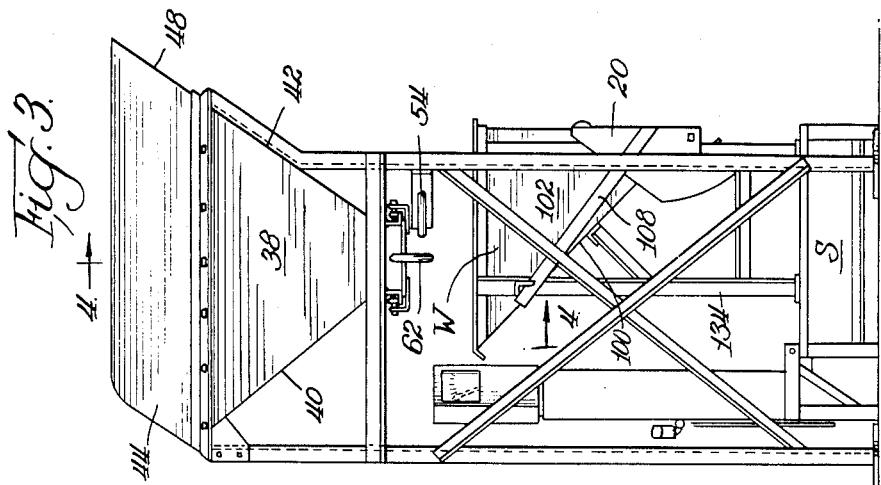
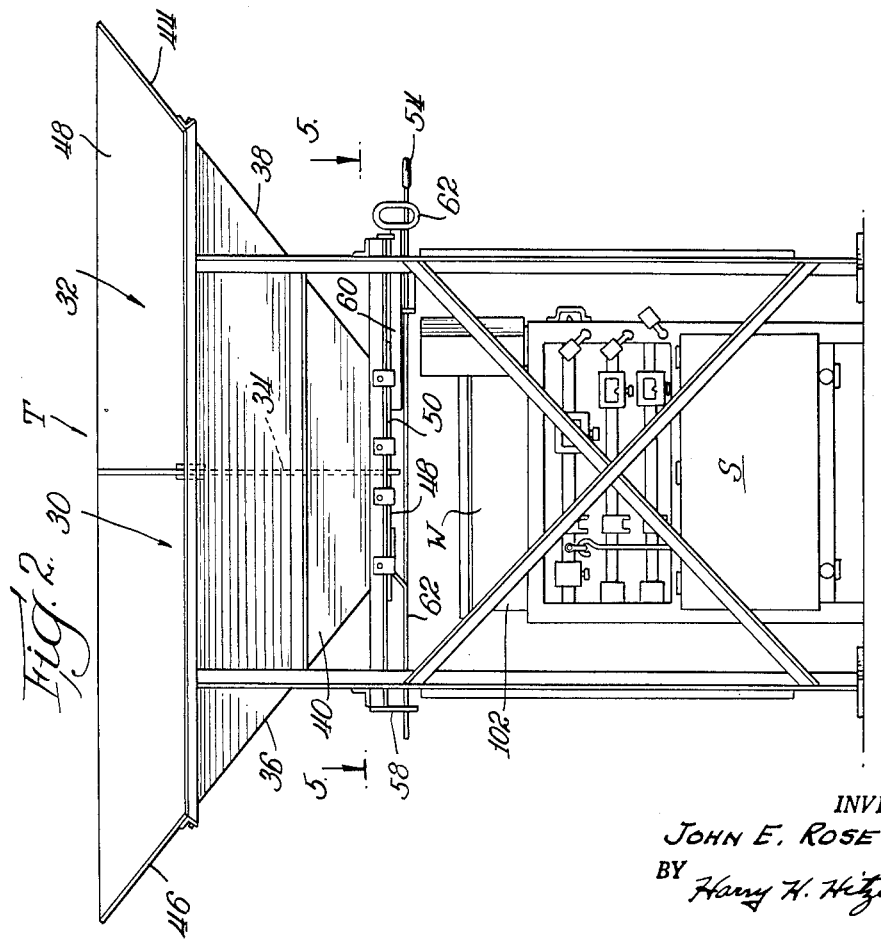
INVENTOR.
JOHN E. ROSE
BY Harry H. Hitzeman
ATTORNEY

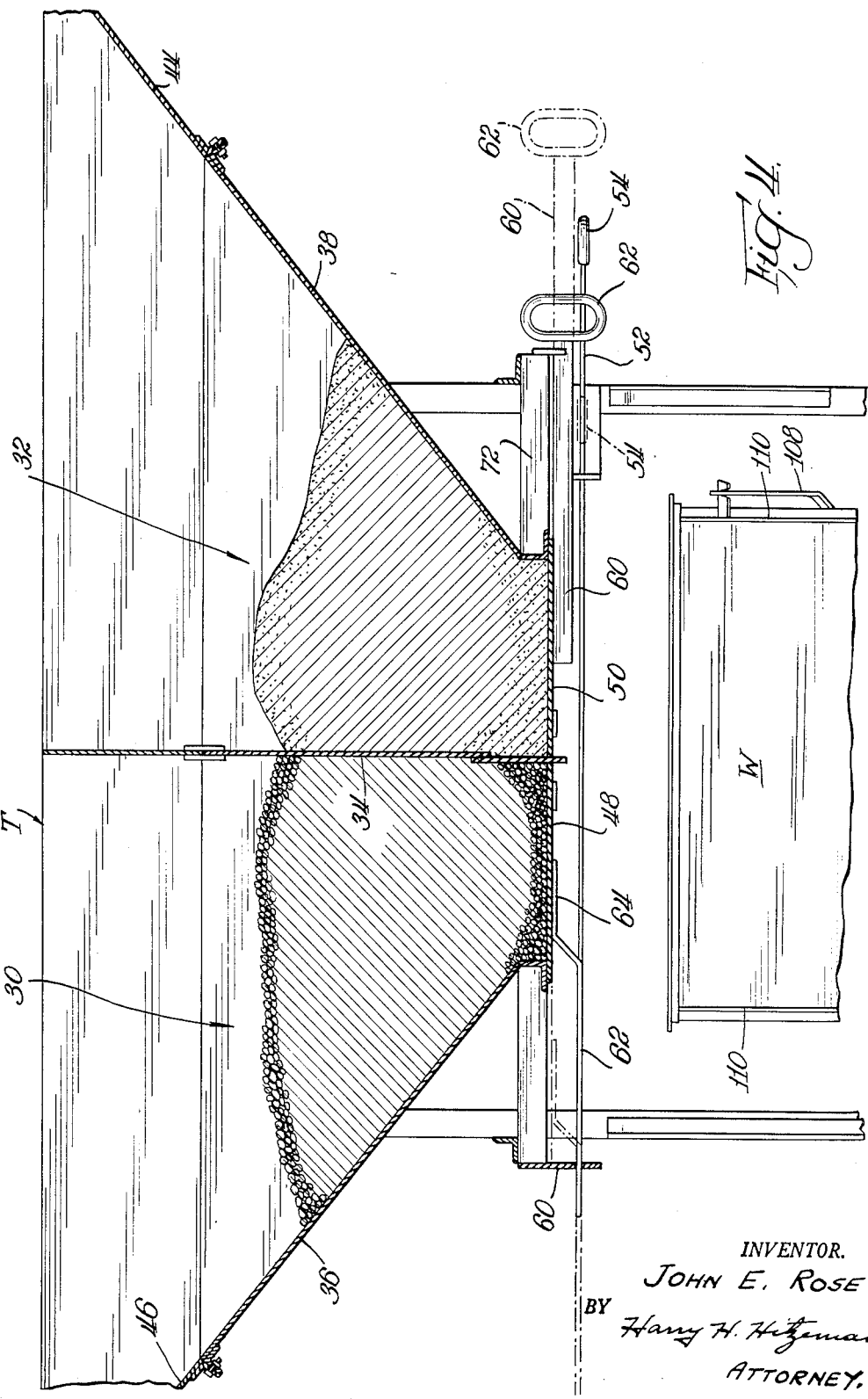

March 6, 1956 J. E. ROSE 2,737,315
TWIN BIN HOPPER CONSTRUCTION
Filed Jan. 18, 1952 5 Sheets-Sheet 4
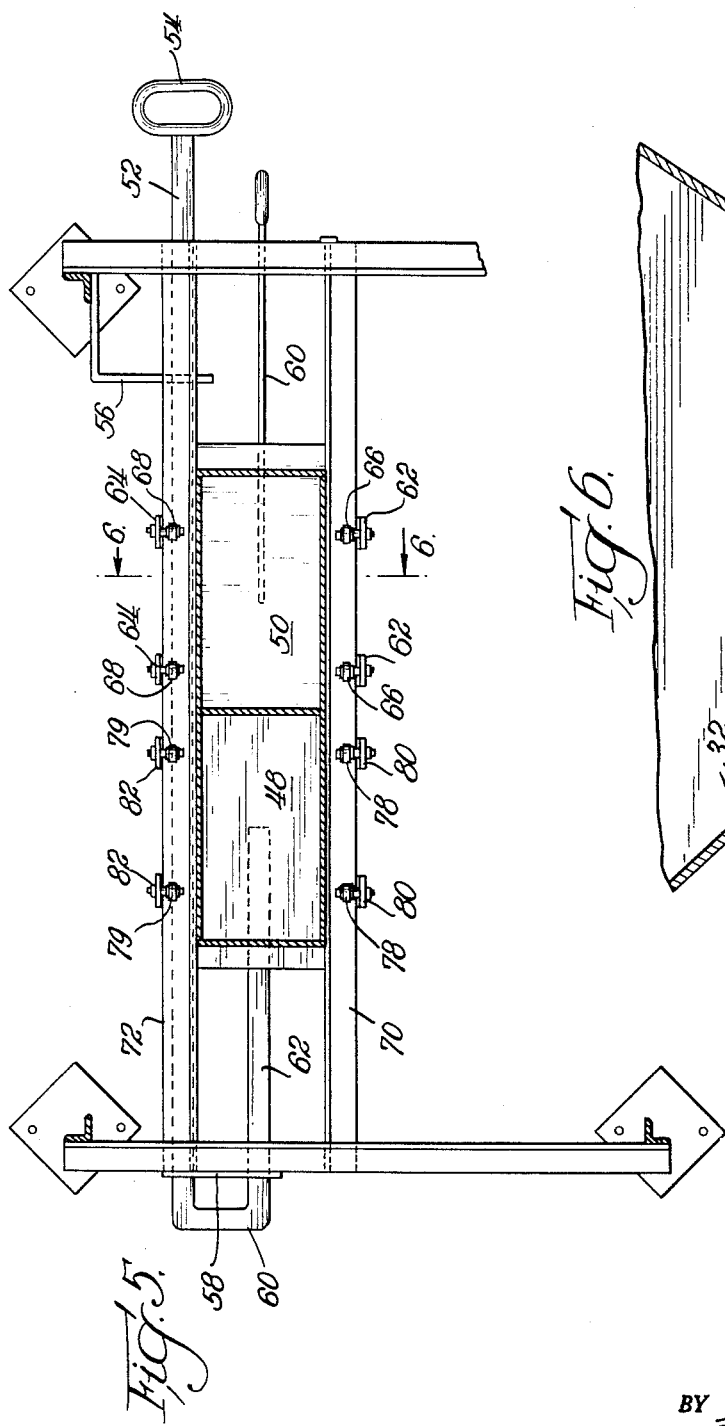
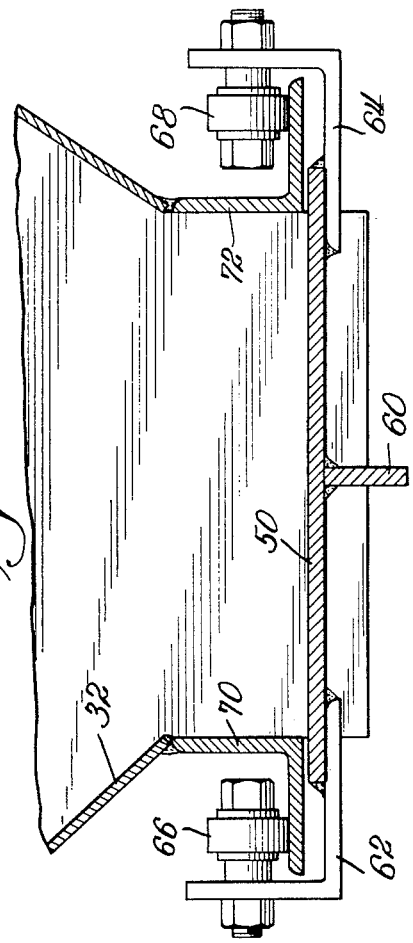
INVENTOR.
JOHN E. ROSE
BY Harry H. Hitzeman
ATTORNEY.

March 6, 1956 J. E. ROSE 2,737,315
TWIN BIN HOPPER CONSTRUCTION
Filed Jan. 18, 1952 5 Sheets-Sheet 5
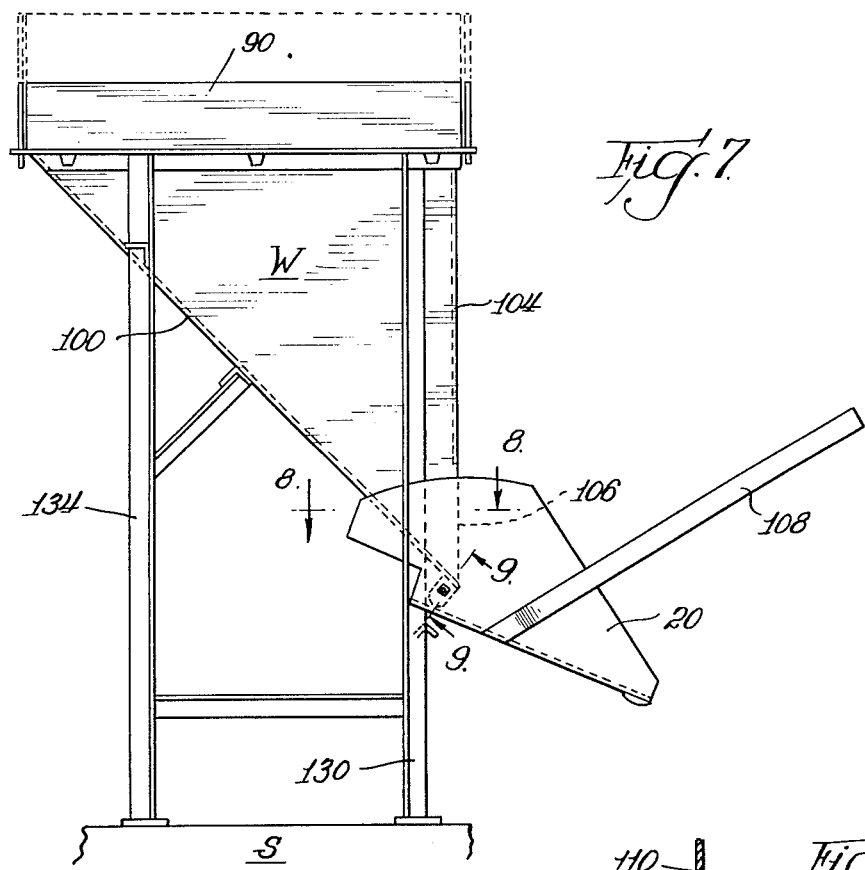
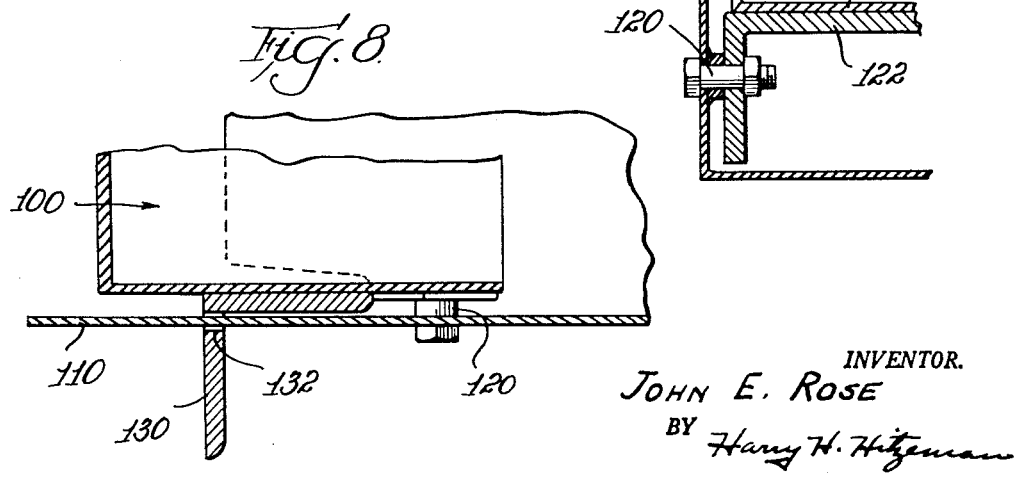
INVENTOR.
JOHN E. ROSE
BY Harry H. Hitzeman
ATTORNEY.

United States Patent Office 2,737,315
Patented Mar. 6, 1956

2,737,315
TWIN BIN HOPPER CONSTRUCTION
John E. Rose, Marshalltown, Iowa
Application January 18, 1952, Serial No. 267,161
7 Claims. (Cl. 222—77)

My invention relates to concrete mixing apparatus and more particularly to the construction of the hopper into which sand and gravel or stone are dumped preparatory to weighing the same for dumping into the concrete mixer skip.

In the past, single or one-bin hoppers with built-in scales have been used extensively, most of them being extremely expensive as contrasted with the double or twin bin hopper which I have provided. Most contractors have the ordinary and well known wheelbarrow scales which are used for weighing wheelbarrow loads of sand, gravel or stone.

A feature of my invention is that I use one of these scales to support the weighing hopper of my ensemble.

Another feature of my invention resides in the provision of a hopper to receive sand and gravel or stone, the hopper having a vertical medial dividing wall whereby in effect two or twin bins are provided for storage of the materials prior to releasing either type of material into the weighing hopper on the scale.

Since the storage bins are comparatively large, the design must be such that the same are sufficiently low so that the average high-lift and scoop mounted on the usual farm tractor can raise the material and drop it into either one of the bins.

Another feature of the invention resides in the particular design whereby with the top of the storage hoppers low enough to permit dumping from the scoop, the dump gate of the weighing hopper is still sufficiently high so that when it is opened the sand or gravel can fall into the center of the mixer skip of the concrete mixing machine.

Summarizing, the features of the invention reside, then, in the provision of twin or double storage bins with the upper end thereof sufficiently low to permit dumping into the same with the usual high-lift, the weighing hopper having its gate sufficiently high so that when opened the material will flow into the skip of the concrete mixer.

For a more comprehensive understanding of the features and advantages of my improved construction, reference is had to the accompanying drawings, upon which:

Fig. 1 is a general perspective view showing the usual farm tractor provided with a power-driven scoop, the twin bin hopper, weighing hopper and scales, and a concrete mixer providing with a skip shown in lowered position, the scoop being in elevated position preparatory to dumping either sand or gravel into one of the storage bins of the twin hopper;

Fig. 2 is a front elevation view of my improved twin bin hopper, weighing hopper and scale construction;

Fig. 3 is a side elevational view thereof taken from the operator's side of the same;

Fig. 4 is a fragmentary vertical sectional view through the combined storage hopper, valves or gates, and weighing hopper which is positioned on the scale, and is taken generally on the line 4—4 of Fig. 3;

Fig. 5 is a plan sectional view directly above the valves or gates, taken generally through the bottom of the storage hoppers on line 5—5 of Fig. 2;

Fig. 6 is a fragmentary cross-sectional view showing the valve or gate construction at the lower end of the storage hoppers, the view being taken generally on the line 6—6 of Fig. 5;

Fig. 7 is a side elevational view of the weighing hopper only, with the dump gate shown in a lowered position to permit the flow of aggregate into the mixer skip;

Fig. 8 is a fragmentary detail sectional view through the forward side of the dump gate and associated parts, taken generally on the line 8—8 of Fig. 7, and Fig. 9 is a detailed cross-sectional view of one side of the support and pivot for the dump gate, taken generally on the line 9—9 of Fig. 7.

In the embodiment of the invention which I have chosen to illustrate and describe, in Fig. 1, I have shown a general view of an assembly of a farm tractor 10 which is provided with a high-lift H and a power-driven scoop 12 disposed at an elevated angle for dumping into the twin bin hopper T. It will also be noted in Fig. 1 that I have shown a scale S below the hopper T, the scale being provided with a weighing hopper W positioned thereon, the weighing hopper having a dump gate 20 above the mixer skip 22 of a concrete mixer 24.

As mentioned in the objects of invention, it will be observed that the twin bin hopper T is sufficiently low so that the scoop 12 mounted upon the farm tractor 10 may be dumped into either one of the bins 30 or 32 of the hopper T, and the dump gate 20 of the weighing hopper or bin is sufficiently high so that it may be moved into the dumping position as shown in Fig. 7 above the mixer skip 22 of the concrete mixer 24.

The specific construction of the double storage hopper and associated parts will now be described in more detail. Referring to Figs. 2 to 9 inclusive, the double storage hopper T conforms in shape generally to an inverted pyramid, having a medial wall 34 and side walls 36, 38, 40 and 42. For the purpose of increasing the capacity to permit a larger amount of aggregate to be placed therein, additional side walls 44, 46 and 48 may be added to the top of the same, it being noted that in this condition a forward wall is not included, inasmuch as the scoop 12 of the high-lift H mounted on the tractor 10 is not required to lift the material in the scoop over the same. As best shown in Fig. 1, the double hopper T is supported by four corner posts 41 connected at their upper ends to the walls of said hopper and mounted on a suitable foundation 43.

As is well known in the concrete mixing art, in road building, bridge building, or other concrete construction work, the aggregate which is dumped into either one of the twin bins 30 or 32 is dropped into an auxiliary weighing bin mounted upon a scale for the purpose of securing a correct measure of aggregate with the proper amount of cement placed in the mixer skip, and the aggregate and cement are then placed into the concrete mixing machine to secure the concrete mix which is desired.

As previously pointed out, in order to save time and labor, it is desirable to have sand and gravel or other similar mixtures in separate bins above the weighing hopper W so that the exact amount of each may be dumped into the mixer skip to be mixed with the cement. For this purpose, the vertical wall 34 is provided in the twin bin hopper T. Separately operable gates or valves 48 and 50 are provided at the rectangular openings at the lower end of the hoppers 30 and 32 respectively. It will further be noted that the wall 34 extends down below the lower edge of the openings in the hoppers or bins 30 and 32. As best shown in Fig. 5, the gate 48 which consists of a flat rectangular plate, is operated by a hand lever 52 having a handle 54 at the operating end of the same, the lever 52 being flat and supported by guides 56 near the front of the twin bin hopper and a guide 58 near the back end of the same, the lever 52 having a right angle bend 60 and being connected by a portion 64 welded to the bottom of the gate or valve 48. The valve or gate 50 which consists of a flat rectangular plate, is manually operable by a vertically disposed lever 60 connected to the lower side of the same and provided with an operating handle 63, also at the front end of the twin bin hopper.

Referring more particularly to Fig. 6 of the drawings, it can be seen that the gate 50 is supported for movement to open or close by two pairs of angle members 62 and 64 which are provided with two pairs of rollers 66 and 68 that ride upon and support the gate 50 upon angle members 70 and 72 which support and form the lower part of the hoppers 32 and 30, respectively. In a similar manner, the gate 48 is supported for movement by two pairs of rollers 78 and 79 supported upon similar pairs of angle members 80 and 82. It can thus be seen that regardless of the weight of the gravel or sand upon either of the gates or valve members 48 or 50, the opening or closing of the gates is a comparatively simple and easy manual operation, since the weight of the aggregate upon the same does not effect the forward or back movement of the gates 48 or 50, the entire weight being supported upon the easily manipulated rollers 66 and 68 or the rollers 78 and 79. It will also be noted that both gates or valve members are in a closed position against the lower edge of the hopper dividing wall 34, each gate being opened by movement away from said wall in a horizontal plane.

The weighing hopper W, as previously mentioned, is mounted upon a wheelbarrow scale S of the type shown in U. S. Patent No. 1,985,542, which is capable of being set to the exact weight of either gravel or sand or other aggregate desired, as is well known in the art. The particular weighing hopper W which I have provided may be so constructed that additional vertical side walls 90 may be attached on all sides to receive a larger amount of material if desired. In the usual type of work three sizes of mixes are used—a 5 cubic foot mix, a 10 cubic foot mix, or a 15 cubic foot mix. For a 5 cubic foot mix no side walls are required in the design which I have provided. For a 10 cubic foot mix, the walls 90 are ordinarily four inches high, and for a 15 cubic foot mix the walls 90 are approximately eight inches high.

The mixing hopper W, as best shown in Figs. 2, 3 and 7, is provided with a sloping back wall 100, vertical side walls 102 and a vertical front wall 104 which has an opening 106 adjacent the lower end of the same. The dump gate 20, previously mentioned, may be in the normal position shown in Fig. 3 while the aggregate is being released from one of the twin hoppers 30 or 32 into the mixing hopper W.

After the desired amount of sand or gravel has been dropped from the hopper 32 into the weighing hopper W, the same is dumped into the mixer skip 22. To do this, the operating handle 108 is pulled forward, pivotally turning the dump gate 20 about a pair of pivot bolts 120 attached to a channel shaped member 122 connected to the lower edge of the sloping rear wall 100 of the weighing hopper W. The dump gate 20 has its parallel side walls 110 guided and supported in the angle members 130, the angle members each having a vertical slot 132 therein, which serve not only as a guide for the side walls of the dump gate 20, but also provide strength and support for the dump gate either in an open or a closed position. Similar vertically disposed angle members 134 at the rear of the weighing hopper W support the same upon the weighing scale S, the weighing hopper being thus rigidly and effectively supported upon the weighing scale S, the four vertical angle members, 130 and 134, being the only support for the same upon the weighing scale S.

From the above and foregoing description, it can be seen that I have provided a hopper construction for use in providing the correct proportions of aggregate to be mixed with cement, which is then dropped into the mixer skip efficiently and with a minimum of manual labor. By the use of the known devices such as a farm tractor with a high-lift and scoop, the aggregate such as sand and gravel or stone may be dumped into either of the twin storage bins above the mixing bin which is mounted upon the usual wheelbarrow scale. One operator is required to operate the gates 48 or 50 to permit the weighing of gravel and stone or sand, the same operator also controling the dump gate 20 of the weighing hopper to permit the movement of either one of the aggregate into the mixer skip 22 of the concrete mixer.

A second operator is required to dump the cement into the mixer skip, and by the use of two operators, as described, the mixing of the aggregate and cement is accomplished, as contrasted with previous methods under which an average crew of six men is required. By the use of an operator on the farm tractor, it can be seen that except for the person or persons required to fill the scoop 12 of the high-lift, only three persons are required to competently and accurately measure out and prepare the concrete mix for use. This is in contrast with the old method of loading sand and gravel by hand, wherein at least ten men have heretofore been required. When the aggregate, that is, sand and gravel or stone, etc., has been dropped into the mixer skip, the dump gate 20 is raised and the operating mechanism of the concrete mixer can pull the mixer skip up and dump into the concrete mixer without any movement of the parts of the mechanism; the only movable object of the ensemble being the farm tractor which of necessity retires and has its scoop pick up another load.

I contemplate that changes and modifications may be made in the exact details shown, and I do not wish to be limited in any particular; rather what I desire to secure and protect by Letters Patent of the United is:

1. Mechanism for storing and weighing material such as sand or gravel, comprising a hopper in the form of an inverted open-ended pyramid, said hopper having a dividing wall therein perpendicular to the front of said hopper and separating the same into two storage bins each with a separate open end, a flat horizontally reciprocable valve at the lower end of each bin normally closing the opening therein, a single weighing hopper positioned below both of said valves and a scale supporting said weighing hopper, both of said hoppers having supports comprising vertical angle members at all four corners of the same, said weighing hopper having an opening and a dump gate adjacent the lower front end of the same, said front end of said weighing hopper being perpendicular to said dividing wall, the front of said weighing hopper and the front of said first mentioned hopper being disposed at opposite ends of said dividing wall, and both of said valves lever-operated from the same side of said bins adjacent said dump gate, said valves movable back and forward parallel to the front of said weighing hopper.

2. Mechanism for storing and weighing material such as sand or gravel, comprising a hopper in the form of an inverted pyramid, said hopper having a dividing wall therein perpendicular to the front of said hopper and separating the hopper into two storage bins, each of said storage bins having a rectangularly shaped bottom opening, the lower end of said dividing wall extending below said openings, a valve for each bin below each of said openings, each of said valves comprising a horizontally disposed rectangular plate having upwardly extending angle members attached thereto, rollers carried by said angle members, parallel tracks on the sides of the bottom openings of said storage bins upon which said rollers support said valves, an operating handle connected to each of said valves, said handles both located on the same side of said mechanism, a single weighing hopper positioned below both of said valves to receive material from either storage bin, said front end of said weighing hopper being perpendicular to said dividing wall, the front of said weighing hopper and the front of said first mentioned hopper being disposed at opposite ends of said dividing wall, and a scale supporting said weighing hopper, both said material hopper and said weighing hopper having supports comprising vertical angle members at all four corners of the same.

3. Mechanism for storing and weighing material such as sand or gravel, comprising a hopper in the form of an inverted pyramid, said hopper having a dividing wall therein perpendicular to the front of said hopper and separating the same into two storage bins, each of said storage bins having a rectangularly shaped bottom opening, the lower end of said dividing wall extending below said openings, a valve for each bin below each of said openings, each of said valves comprising a horizontally disposed rectangular plate having upwardly extending angle members attached thereto, rollers carried by said angle members, parallel tracks on the sides of the bottom openings of said storage bins upon which said rollers support said valves, an operating handle connected to each of said valves, said handles both located on the same side of said mechanism, a single weighing hopper positioned below both of said valves to receive material from either storage bin, said front end of said weighing hopper being perpendicular to said dividing wall, the front of said weighing hopper and the front of said first mentioned hopper being disposed at opposite ends of said dividing wall, and a scale supporting said weighing hopper, both said material hopper and said weighing hopper having supports comprising vertical angle members at all four corners of the same, the lower end of said dividing wall forming a limit stop for closing of each valve.

4. Mechanism for storing and weighing material such as sand or gravel, comprising a hopper in the form of an inverted pyramid, a support frame therefor comprising four corner posts connected at their upper ends to the walls of said hopper, said hopper having a vertical dividing wall medially therein perpendicular to the front of said hopper and separating the same into two storage bins, each of said storage bins having a rectangularly shaped bottom opening, said dividing wall extending below said openings, a valve for each bin below each of said openings, each of said valves comprising a horizontally disposed rectangular plate having upwardly extending angle members attached thereto, rollers carried by said angle members, parallel tracks on the sides of said hopper adjacent the bottom openings of said storage bins, said rollers positioned on said tracks whereby said rollers support said valves and a weighing hopper positioned below both of said valves, each of said valves having a handle for reciprocally moving said valves below said openings, said handles both being located on the same side of said mechanism and said valves adapted to be moved away from said hopper dividing wall to uncover said openings.

5. Mechanism for storing and weighing material such as sand or gravel, comprising a hopper in the form of an inverted pyramid, a support frame therefor comprising four corner posts connected at their upper ends to the walls of said hopper, said hopper having a dividing wall medially therein perpendicular to the front of said hopper and separating the same into two storage bins, each of said storage bins having a rectangularly shaped bottom opening, said dividing wall extending below said openings, a valve for each bin below each of said openings, each of said valves comprising a horizontally disposed rectangular plate having upwardly extending angle members attached thereto, rollers carried by said angle members, parallel tracks on the sides of said hopper adjacent the bottom openings of said storage bins, said rollers positioned on said tracks whereby said rollers support said valves and a weighing hopper positioned below both of said valves, said front end of said weighing hopper being perpendicular to said dividing wall, the front of said weighing hopper and the front of said first mentioned hopper being disposed at opposite ends of said dividing wall, each of said valves having a handle for reciprocally moving said valves below said openings, said valves adapted to be moved away from said hopper dividing wall to uncover said openings, both of said handles being located on the same side of said mechanism and adapted to move said valves to open position away from said medial perpendicular dividing wall.

6. In apparatus of the class described, the combination of a weighing scale, a stationary hopper positioned thereon, a second hopper positioned above said first hopper, said second hopper having a medial vertical dividing wall to form two bins therein and aligned discharge openings on both sides of said wall, a separate horizontally disposed plate valve for each opening, said plate valves being in aligned positions, both of said valves manually operable from the same side of said apparatus to move the same away from said vertical dividing wall, and said first hopper having a vertically disposed pivoted dump gate on the front side thereof capable of being swung open to permit dumping into the skip of a stationary concrete mixer, the front end of said weighing hopper being perpendicular to said dividing wall, the front of said weighing hopper and the front of said first mentioned hopper being disposed at opposite ends of said dividing wall.

7. In apparatus of the class described, the combination of a weighing scale, a stationary hopper positioned thereon, a second hopper positioned above said first hopper, said second hopper having a medial perpendicular dividing wall to form two bins therein and aligned discharge openings on both sides of said wall, a separate plate valve for each opening, said valve plates being in aligned positions, parallel support rails on both sides of said bins, rollers on said valve plates riding on said rails, both of said valves manually operable from the same side of said apparatus to move the same toward or away from said vertical dividing wall, and said first hopper having a dump gate on the front end of the same capable of being swung open to permit dumping into the skip of a stationary concrete mixer, the front end of said weighing hopper being perpendicular to said dividing wall, the front of said weighing hopper and the front of said first mentioned hopper being disposed at opposite ends of said dividing wall.

References Cited in the file of this patent

UNITED STATES PATENTS

| | | |
|---|---|---|
| 110,601 | Stoll | Dec. 27, 1870 |
| 1,384,175 | Allen et al. | July 12, 1921 |
| 1,724,403 | Hutchinson | Aug. 13, 1929 |
| 1,997,065 | Madsen | Apr. 9, 1935 |
| 2,038,746 | Madsen et al. | Apr. 28, 1936 |
| 2,046,693 | McCrery | July 7, 1936 |
| 2,549,704 | Noble | Apr. 17, 1951 |
| 2,591,785 | Crawford et al. | Apr. 8, 1952 |
| 2,625,301 | Saxe | Jan. 13, 1953 |